United States Patent [19]
Herzberg et al.

[11] Patent Number: 5,379,291
[45] Date of Patent: Jan. 3, 1995

[54] APPARATUS FOR FIBER DISTRIBUTED DATA INTERFACE DYNAMIC STATION BYPASS VIA SKIPPING AND HOPPING

[75] Inventors: Louis P. Herzberg, Monsey; Antonio Ruiz, Yorktown Heights; Marc H. Willebeek-LeMair, Mt. Kisco, all of N.Y.

[73] Assignee: International Business Machines Corporation, Armonk, N.Y.

[21] Appl. No.: 997,798

[22] Filed: Dec. 29, 1992

[51] Int. Cl.6 .............................................. H04L 12/42
[52] U.S. Cl. ............................. 370/85.5; 370/85.12; 370/85.14; 370/85.15; 370/94.3
[58] Field of Search ................... 370/85.3, 85.4, 85.5, 370/85.12, 85.13, 85.14, 85.15, 94.3, 14, 16.1, 58.2, 75, 123, 85.1, 85.2, 16, 85.6, 85.9

[56] References Cited

U.S. PATENT DOCUMENTS

| | | | |
|---|---|---|---|
| 5,051,985 | 9/1991 | Cidon et al. | 370/85.5 |
| 5,101,405 | 3/1992 | Bekki et al. | 370/85.12 |
| 5,134,610 | 7/1992 | Shand et al. | 370/85.13 |
| 5,210,749 | 5/1993 | Firoozmand | 370/85.1 |
| 5,241,540 | 8/1993 | Ocheltree | 370/85.12 |

FOREIGN PATENT DOCUMENTS 2248369 4/1992 United Kingdom ............... 370/85.4

OTHER PUBLICATIONS

Stallings, "Data and Computer Communications", 1988, pp. 346-348.

*Primary Examiner*—Douglas W. Olms
*Assistant Examiner*—Huy D. Vu
*Attorney, Agent, or Firm*—Whitham, Curtis, Whitham & McGinn

[57] ABSTRACT

A rights controlling concentrator (RCC) is an apparatus for separating and controlling "rights of receiving" and "rights of transmitting" of a group of stations or groups of stations on a ring-of-trees local area network. RCC elements perform collectively to separately control, limit and/or make available the "rights of receiving" and the "rights of transmitting" of a group of stations or groups of stations. Control of the "rights of receiving" ensures that its membership is only forwarded frames transmitted by an external station which has a destination within the membership, and that the external stations only be forwarded frames transmitted by the membership which have a destination within the external stations. Frames that are transmitted to a destination in one group traverse only stations within that group. Frames that are deemed by the RCC not to be of interest to any group of stations are withheld from that group by the RCC controlling both frame receiving and transmitting rights. This significantly reduces the workload of groups of stations, because frames are not passed through station groups that are not necessary for the frames to reach their destination. Furthermore, since data frames are handled by fewer stations, the reliability of the main ring is increased. Control of the "rights of transmitting" ensures that the token is, or can be, withheld from stations that are "listen only" and need not be given the rights to transmit. This reduces the travel time of the token around the ring (and the Token Target Rotation Time (TTRT)), providing faster repeating opportunities for the transmitting stations to transmit.

4 Claims, 7 Drawing Sheets

APPARATUS FOR FIBER DISTRIBUTED DATA INTERFACE DYNAMIC STATION BYPASS VIA SKIPPING AND HOPPING

BACKGROUND OF THE INVENTION

1. Field of the Invention

The present invention generally relates to local area networks employing a token-based ring-of-trees topology and, more particularly, to a method and apparatus for improving the operation of such networks by using rights controlling concentrators.

2. Description of the Prior Art

The interconnection and interoperation of distributed computing devices is an old but continuing challenge. In recent years many of those who have thought about this challenge have concluded that the most effective way to promote progress is to parse the task into relatively independent but connected pieces and develop a corresponding set of standards. Different systems can then communicate if they follow the standards at their corresponding levels; they may rely upon parallel coördination through standards at other levels to complete the communication path. The Open Systems Interconnection (OSI) reference model reflects this view.

The OSI model defines seven layers—from the physical link dealing with mechanical and electrical characteristics of signals to the application layer which provides file transfer and network management services to users. Local area network (LAN) standards within the OSI model are the subject matter and constraints for the present invention. Local area networks are characterized by a topology (e.g., ring or bus) for connecting devices to the LAN's signal transmission medium (e.g., electrical cable or optical fiber) and a protocol (e.g., token-ring or timed-token) for controlling access to the medium by an attached device.

Communication volume over a LAN is limited by the transmission medium and also by the topology and the relevant protocols at both the physical and medium access control levels. "Bandwidth" is a measure of the communication capacity of a LAN, and is commonly given in bits per second. For example, the bandwidth of a coaxial cable ethernet LAN may be 10 million bits per second (Mbps) while a fiber optic distributed data interface (FDDI) LAN using a timed-token protocol may be 100 Mbps.

However, these figures are nominal capacities. Typically, the aggregate communication needs of devices attached to a LAN are an irregular mix of stream and bursty traffic. The LAN's capacity may be under utilized at one time and overloaded at another.

It would be advantageous to have a means wherein each frame that enters and leaves a LAN concentrator essentially unchanged should be expedited through the concentrator quickly with minimal asset utilization. This should be achieved by a means that can selectively control LAN station's "receiving and transmitting rights". Thus, an apparatus is necessary that is capable of separating and controlling a stations' or group of station's "rights of receiving", and its (or their) "rights of transmitting".

SUMMARY OF THE INVENTION

It is therefore an object of the present invention to ensure that a group of stations on a token-based ring-of-trees LAN are only forwarded frames transmitted by an external station which have a destination within the membership group.

It is also an object of the invention that external stations only be forwarded frames which have a destination within the external stations.

It is a further object of the invention that frames transmitted to a destination in one group traverse only stations within that group.

It is an object of the invention to significantly reduce the workload of groups of stations by not passing frames through station groups that are not necessary for the frames to reach their destination.

It is also an object of the invention to increase the reliability of the main ring and increase the chances of successful transmission.

It is a further object of the invention to increase the availability of stations for local processing.

Another object of the invention is to reduce the average time for a frame to arrive at its destination.

A further object of the invention is to reduce the actual Token Rotation Time (TRT).

According to the invention, a rights controlling concentrator (RCC) provides means to selectively withhold "receiving rights" and/or "transmitting rights" from LAN components (stations, concentrators, MAUs, etc.) for frames that need not pass through them. The RCC causes these frames to be withheld from (and bypass) these LAN components. Specifically, 1) if a frame from an external component is not addressed to any component in an RCC's membership, the RCC will repeat the frame back onto the ring, skipping past its membership; 2) if a frame is not addressed to any component in a particular M-port on the RCC's back-end, the RCC will hop the frame over this port; 3) if a frame from a component in the RCC's membership is not addressed to any external component, the RCC will not transmit the frame onto the main ring; and if all the components in an RCC's membership, or connected to a particular M-port of the RCC, are "listen-only"; 4) the RCC will cause the Token frame to skip or hop, as appropriate, so as to bypass such "listen only" components, and will simultaneously issue a pseudo Token frame (a Token frame without "transmitting rights") to the "listen-only" components in order to satisfy timing needs of the "listen-only" components; and 5) in order to prevent frame loss for broadcast type frames addressed both to a "listen-only" component and an external component, the RCC will route such frames simultaneously to both groups. This improves ring performance and reliability, and decreases frame latency, component task load and actual Token Rotation Time.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
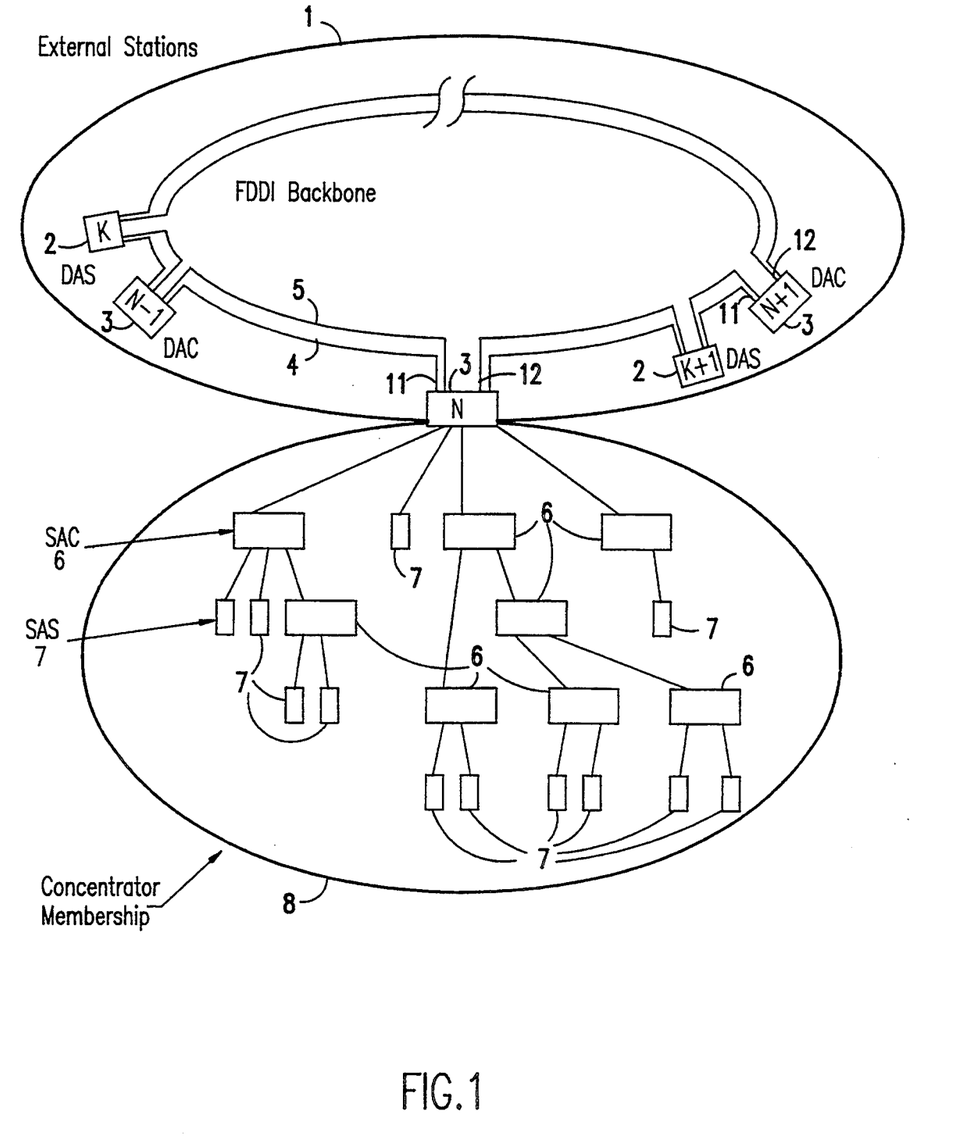
FIG. 1 is a block diagram of a typical FDDI Network.

The present invention is a method and apparatus for improving the effective capacity of a local area network (LAN) employing a token-based ring-of-trees topology. This topology is known to those familiar with the state of the art in its use in standard LANs such as FDDI and IBM's Token Ring. Although reference in the description of the invention is often made, by way of example, to FDDI, the invention is similarly applicable to any token-based ring-of-trees topology. For the purposes of this invention the following terminology is defined, with reference to FIG. 1:

concentrator front end: A concentrator's A-Port and B-Port (normally ring-side) connecting terminals (e.g., 11 and 12 relative to DAC #N).

concentrator back end: A concentrator's M-Port (normally non-ring-side) connecting terminals (e.g., 9).

concentrator membership: LAN components (e.g., 8 relative to DAC #N, consisting of stations, Multistation Access Units (MAUs), other concentrators) connected to a concentrator's back end.

port X membership: LAN components that are connected onto the main ring through a common M-port, namely port X (e.g., a particular one of the M-ports 9), of a concentrator's back end.

external (non-membership) stations: All LAN components (e.g., 1 relative to DAC #N) connected to the (main) ring, on the front-end of a specific concentrator, which are thus considered to be outside of a specific concentrator's membership. This includes all components connected via another concentrator.

group: One or more stations meeting a particular description.

dually attached station (DAS): A station 2 that can be attached to both the primary ring 4 and secondary ring 5.

singly attached station (SAS): A station 7 that can only be attached to one ring.

dually attached concentrator (DAC): A concentrator 3 that can be attached to both the primary and secondary rings.

singly attached concentrator (SAC): A concentrator 6 that can only be attached to one ring.

Multistation Access Units (MAU): An access closet unit upon which stations are connected to the ring.

As shown in FIG. 1, the token based ring-of-trees topology has a main ring 4 upon which are connected a limited number of singly 7 or dually 2 attached stations, singly 6 or dually 3 attached concentrators and/or Multistation Access Units, etc. Each of these elements has a single input and a single output directly connected to the main ring. The input of each such station, concentrator or MAU is connected via the station-to-station interconnecting media (optical fiber, coax, twisted pair, etc.) to an upstream station, concentrator or MAU. The output of each is in like fashion connected to a downstream station, concentrator or MAU such that the totality of main ring stations, concentrators, MAUs, etc. form a closed ring as shown in FIG. 1.

Quite often the stations, concentrators and MAUs are interconnected by a second such ring to form a dual ring network in order to provide increased reliability through redundancy. One ring 4 is then referred to as the primary ring and the other ring 5 is referred to as the secondary ring. If there is a break in the primary ring, the secondary ring may be connected with the primary ring on either side of the break so as to preserve the ring topology. The features of this invention are not dependent upon or concerned with the dual ring aspect. At any instance, the actual ring being employed is called the main ring.

The tree topology is obtained by the tree-like expansion of the LAN through concentrators. A concentrator is connected to the main ring at its front-end via its 'A' 11 and 'B' 12 ports. Its purpose is to serve as a main ring buffer upon which other stations and/or concentrators are attached. These attachments are made at the concentrator's back-end M-ports. The connectivity of concentrators to the back ends of other concentrators gives the appearance of branches of a tree. Once connected, all the stations, whether they are resident directly on the main ring or are connected through one or more concentrators, form a single LAN ring. The result of the ring-of-trees topology is that following completion of the network setup algorithm, all stations are electrically connected in series so as to receive and repeat to its downstream neighboring station all ring transmissions sent to it via its upstream neighbor.

All transmissions circulate the ring in the form of frames. Each station monitors, processes and repeats all these transmissions to its downstream neighbor. It copies and acknowledges receipt of all frames for which it is the destination station by setting the frame's receive bit. Each station gets the ability to transmit its frames onto the ring when it receives and captures the ring Token. The time interval between two successive interceptions (receptions) by a station of useable Tokens is called "Target Rotation Time" (TRT). Frames are normally removed from the ring when they are ultimately received by their originating station. This also serves as an ability for the originating station to ascertain that the frame was received and acknowledged by the destination station.

The serial nature of the ring-of-trees topology operation requires that all information frames pass through each and every station in the network. At each station each frame must be received, processed, and re-transmitted onto the ring. Therefore, although the frame is only of interest at its source and destination station, every station performs a significant number of tasks on each and every frame.

Ordinarily, this is advantageous to the network performance in that this process succeeds in forwarding the message frames along the network via their often lengthy interconnecting media. Every time the frame passes through a station, it is reinvigorated for its continued travel along its pathway to and from the source and destination stations. However, when concentrators or MAUs are employed to interconnect two or more stations onto the ring, the process is often wasteful of both time consumed and station use. For example, all frames that both originate and are destined for stations that are not on a Concentrator's Membership 8 gain nothing in having those frames pass through all the concentrators back-end connected stations. These frames, in the best case, leave the concentrator in the same form they entered at essentially the same network point without any gain in travel distance towards the station that is the desired destination. Similarly, for frames that both originate and are destined for stations that are on a Concentrator's Membership 8, there is no gain in their being fed out and back into the concentrators front-end after a usually long trip through the many disinterested concentrator front-end External Stations 1. The frame ultimately exits the concentrator at essentially the same network point that it has entered, namely that concentrator, without any modification.

Besides the wastefulness of passing these frames through disinterested stations, this generally reduces the reliability with which frames are transmitted to and from the source and destination stations. This is because the unnecessary processing of the frame by the disinterested stations imparts upon the frame the effects of the reliabilities (bit error rate or BER) of all these disinterested stations. It causes these disinterested stations to process, analyze, and repeat these frames unnecessarily. It also increases the transmission travel time (or latency) of these frames in getting from their source to their destination and back. These are all the result of stations or groups of stations unnecessarily receiving frames which are essentially of no interest to them. Also when a concentrator's back-end only consists of, or is purposely made to consist of, stations that need only to listen (receive, process and repeat) but have no need to talk (transmit), the passing of the main ring Token through them is unnecessary, wasteful and performance deteriorating.

This invention consists of such an apparatus, the Rights Controlling Concentrator, RCC, whose components perform collectively to separately control, limit and/or make available the "rights of receiving" and the "rights of transmitting" of a group of stations or groups of stations. Thus by, controlling the "rights of receiving" the RCC controls the privilege and/or obligation of particular stations in regard to particular frames. Similarly by controlling the "rights of transmitting", it controls a group of station's or groups of stations' privilege and/or obligation of transmitting.

Additionally, LAN performance efficacy is related to Token Rotation Time and ring latency. Both of these are effected by the travel distance and pathways of the information and the Token frames. Thus, the intelligent control and limiting of "receiving and transmitting rights" enhances the LAN's performance by shortening the distance of frame travel for many frames.

This invention is the provision to a LAN concentrating device, RCC, the means to ensure that its Membership 8 is only granted "receiving rights" and is forwarded a frame transmitted from an External Station 1 only when the frame has a source or destination within the Membership 8; and the External Station 1 only be granted "receiving rights" and is forwarded frames transmitted by the Membership 8 only when the frame has a source or destination address within the group as the sourcing station traverse only the stations within that group. Thereby, frames that are deemed by the RCC not to gain anything in being routed to any particular group of stations are withheld from that group of stations by the RCC.

Likewise, the main ring Token frame, that normally provides "transmitting rights" to a station, is only forwarded by the RCC to stations (or group of stations) that require and are granted transmission rights. Thus the RCC controls both frame "receiving rights" and "transmitting rights".

In one embodiment of this invention, the RCC apparatus functions such that all stations are continually afforded their normal "rights for transmitting" (i.e., Token is not withheld). However, the apparatus intelligently withholds from stations, or groups of stations, the "right to receive" particular transmissions for which these stations are deemed to be not supportive of the transmitting station's goal that the communication arrive at the destination stations.

In another embodiment of this invention, the apparatus functions such that it withholds from a station or group of stations the "rights for transmitting" (i.e., token is withheld). This results in having the ring token circulate faster and skip over stations that have no need for "rights to transmit". Its use is dependent upon the circumstances of the membership of a group of stations on the ring. For example, this would be done for stations that are deemed to be given only some "rights to receive". The RCC causes the token to be withheld from these stations. In some instances special precautions must be exercised when this is employed to prevent loss of frames. Frame loss resulting frown token bypass is prevented by the RCC through its simultaneous routing of frames that may be lost to both its membership and its external membership. Simultaneous routing is also employed in FDDI LANs in order to satisfy the expectation of a token at "listen-only" stations. Otherwise their TRT timers would continually time out and declare the ring to be faulty.

In the preferred embodiment of this invention, the RCC apparatus functions to control both the "rights for receiving" and the "rights for transmitting" of a group or groups of stations so as to enhance the ring's performance. The RCC intelligently withholds from groups of stations their "right to receive" particular transmissions for which these stations are deemed to be not supportive of the transmitting station's goal that the communication arrive at the destination stations. It also functions such that it withholds from a group of stations the "rights for transmitting" (i.e., token is withheld).

The RCC can perform these functions by either the SKIPPING and/or HOPPING methods described below. The RCC consists of the following elements which operate collectively to perform the functions of this invention:

1. "Membership Bypass Controller" (MBC) FIG. 2, item 15.
2. "Backbone Bypass Controller" (BBC) FIG. 2, item 20.
3. "M-Port Bypass Circuit" (MPBC), FIGS. 2 and 3, item 13.
4. "Contention Arbitrator and Control" (CAC), FIG. 5, item 14.

Figure 2:
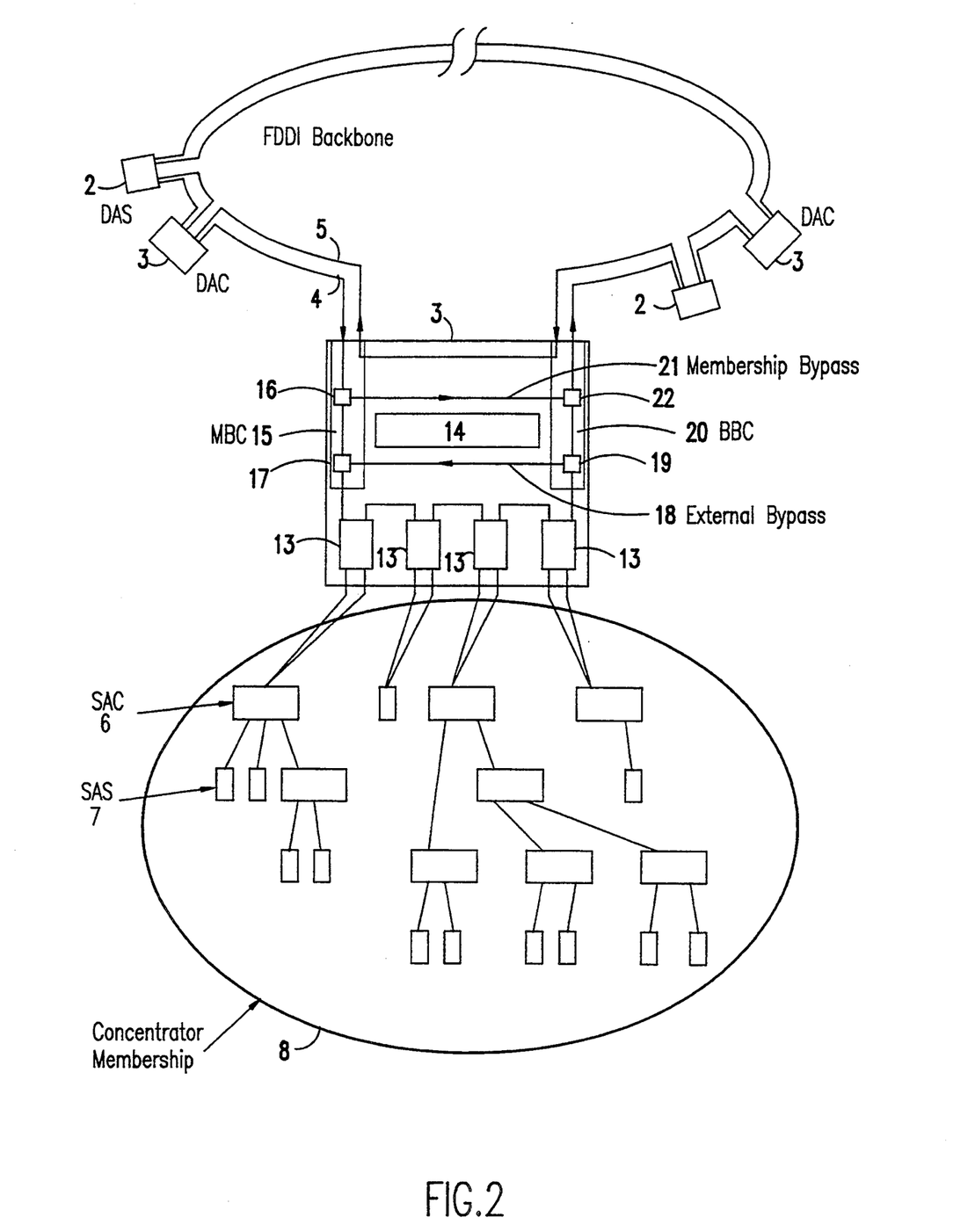
FIG. 2 is a block diagram of a rights controlling concentrator (RCC)
Figure 3:
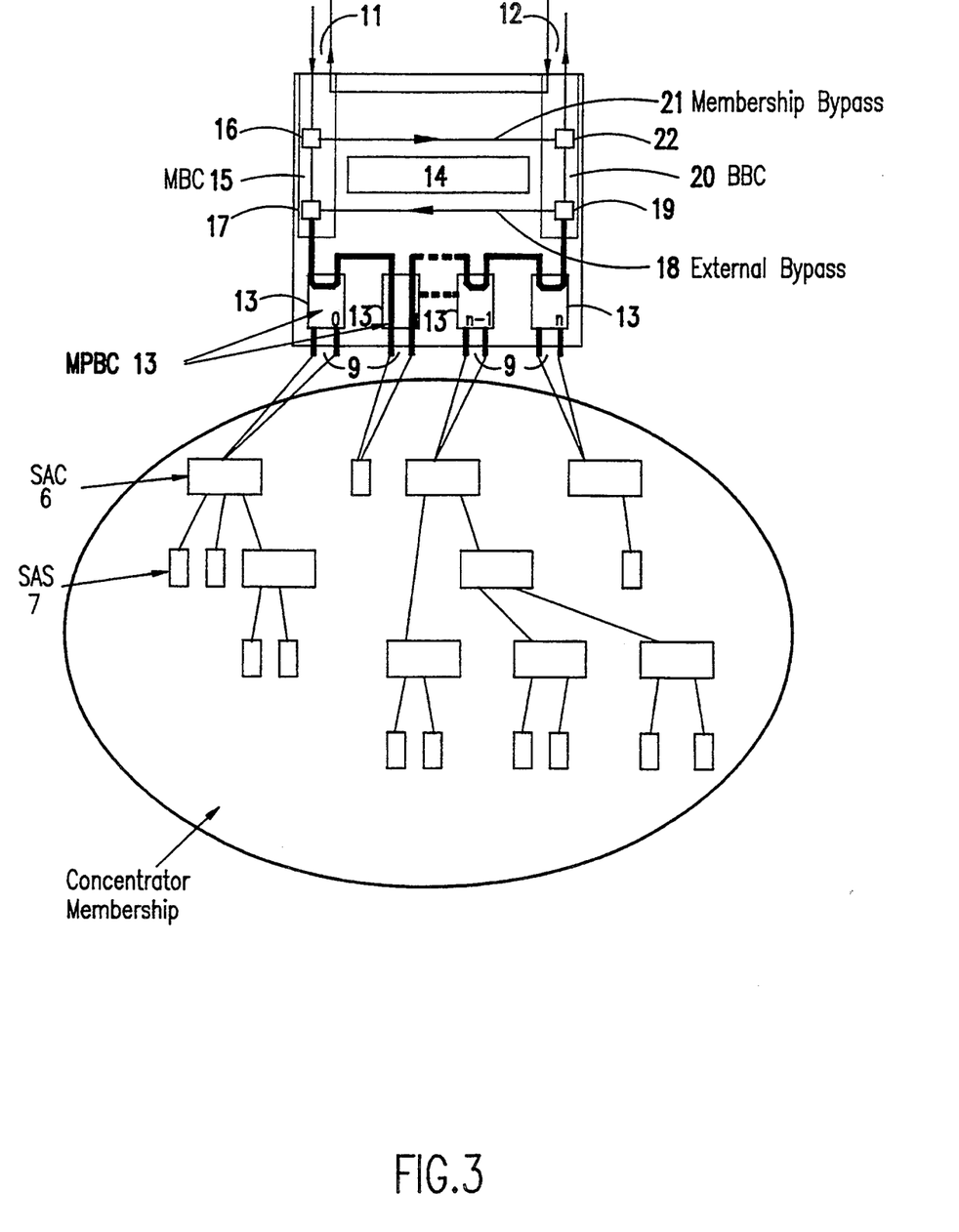
FIG. 3 shows HOPPING to and from M-Port:1.

The first two components, namely, the "Membership Bypass Controller" (MBC) 15 and the "Backbone Bypass Controller" (BBC) 20 are required to achieve the respective enhanced invention performance as described subsequently. The MBC 15 and the BBC 20 can be identical hardware-wise and/or software-wise.

Membership Bypass Controller (MBC)

Referring to FIG. 2, the "Membership Bypass Controller" (MBC) 15 monitors all incoming frames from the External Stations 1 and determines the source and destination address of each frame. It provides receiving rights and routes frames to its Membership 8. Otherwise, the frame is withheld and made to bypass the Membership 8 by being routed via the Membership Bypass 21, from terminal 16 to terminal 22.

When an MBC 15 detects the main ring Token frame, it withholds the transmission rights from its Membership 8 if all its Membership 8 consists of "listen-only" stations. The MBC 15 does this by forwarding a pseudo Token frame to its membership so as to satisfy the needs of the timers within its Membership 8. Although the pseudo Token is electrically identical to the main ring Token, it does not confer upon the listen-only stations station-to-station "transmitting rights". Thus, it is not to be considered (or confused with) a second Token in competition with the main ring Token. It is never forwarded to the External Stations 1 just as the main ring Token is never forwarded to the listen-only stations. The pseudo Token is removed from the network when it reaches and is detected by the Backbone Bypass Controller 20. Normally, this does not result in frame loss since all frames destined for an External Station 1 always precede the main ring Token and were already routed onto the Membership Bypass 21. Any broadcast type frames that have a destination to stations on both a listen-only Membership 8 and External Stations 1 are routed to both these groups (1 and 8) simultaneously to prevent frame loss.

Backbone Bypass Controller (BBC)

The second component of this invention is the "Backbone Bypass Controller", (BBC) 20. The BBC 20 monitors all the frames received from the RCC's Membership 8 at terminal 19. It determines the source and destination address of each frame. It provides "receiving rights" and routes a frame to the External Stations 1 via terminal 19 to 22, only if the frame's source or destination station address is for a station within the External Stations 1. Otherwise, the frame is withheld and made to bypass the External Stations 1 by being routed via the External Bypass 18 from terminal 19 to terminal 17.

Skipping and Hopping

Use of the Membership Bypass 21 to restrict its "rights controlled" bypassing (or non-bypassing) function to an RCC's entire membership is called "SKIPPING". SKIPPING is performed by the Membership Bypass 21 as shown in FIG. 2. Normally, a large number of contiguous frames would be associated with the same source and destination address. Therefore, once SKIPPING is invoked, it would generally be invoked for a significant time duration. During this time, the Membership 8 of the RCC can continue (or commence) to operate in a local mode. The local mode needs to be terminated only upon the MBC's recognition of a frame required to be forwarded to the concentrator's Membership 8.

An alternative to SKIPPING which enables "receiving and transmitting rights" control via bypass of partial Membership 8 is called "HOPPING". HOPPING is a function performed by the third component of this invention. The is the "M-Port Bypass Circuit" (MPBC) 13 shown in FIGS. 2 and 3 and described below.

M-Port Bypass Circuit (MPBC)

The "M-Port Bypass Circuit" (MPBC) 13 performs the HOPPING function. It contains the switches for particular M-Port bypass 9. An MPBC 13 can be inserted at each M-Port of the RCC. HOPPING enables the selective bypassing of one or more M-Ports of the RCC. HOPPING is performed under the control of the MBC 15 as an alternative to use of the full Membership Bypass 21. For example, in HOPPING the MPBCs 13 can be called upon for Membership 8 bypass of all but a particular M-Port, such as M-Port "1" in FIG. 3. In the case shown, only M-Port "1" is granted "receiving rights" for the incoming frames frown the External Stations 1. These frames have been found by the MBC 15 to have a source or destination address of a station in M-Port "1's" membership. The remaining components of the Membership 8 can operate, or continue to operate, coöperatively in a local ring. HOPPING can be performed to and from any number or combination of M-Ports such as to grant "receiving rights" and forward frames from the External Stations 1 only to selected M-Port(s).

Figure 4:
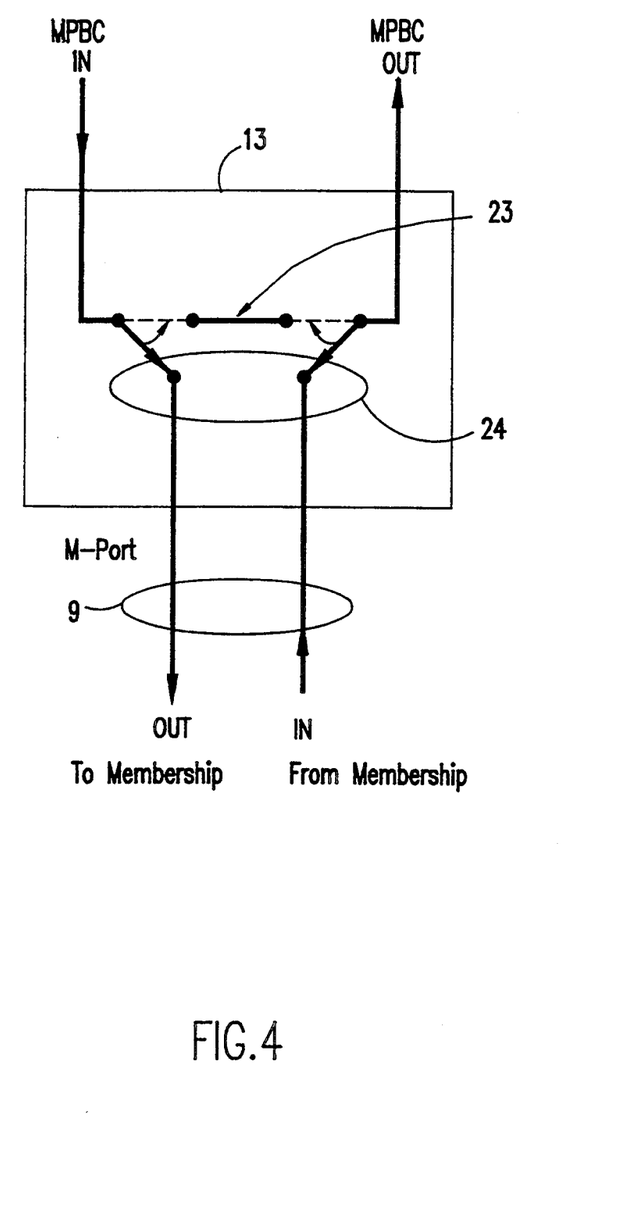
FIG. 4 is a block diagram of the M-Port Bypass Circuit (MPBC)

The basic circuit diagram of an MPBC 13 is shown in FIG. 4. The MPBC 13 is only required for embodiments that perform HOPPING. It provides the MBC 15 with the ability to control the "rights of receiving and transmitting" for a particular M-Port 9 or any combination of M-Ports of the RCC. Frames are then routed either for M-Port inclusion via port channel 24, or for M-Port bypass via bypass channel 23 of MPBC 13 associated with M-Port 9.

The decision to do only SKIPPING or to also allow HOPPING is dependent upon the policy manually or automatically programmed into the MBC 15. For instance, HOPPING could be disabled (or enabled) for M-Ports 9 which have a recent history of a considerable (or minuscule) information exchange rate with the External Stations 1.

Contention Arbitrator and Control (CAC)

Figure 5:
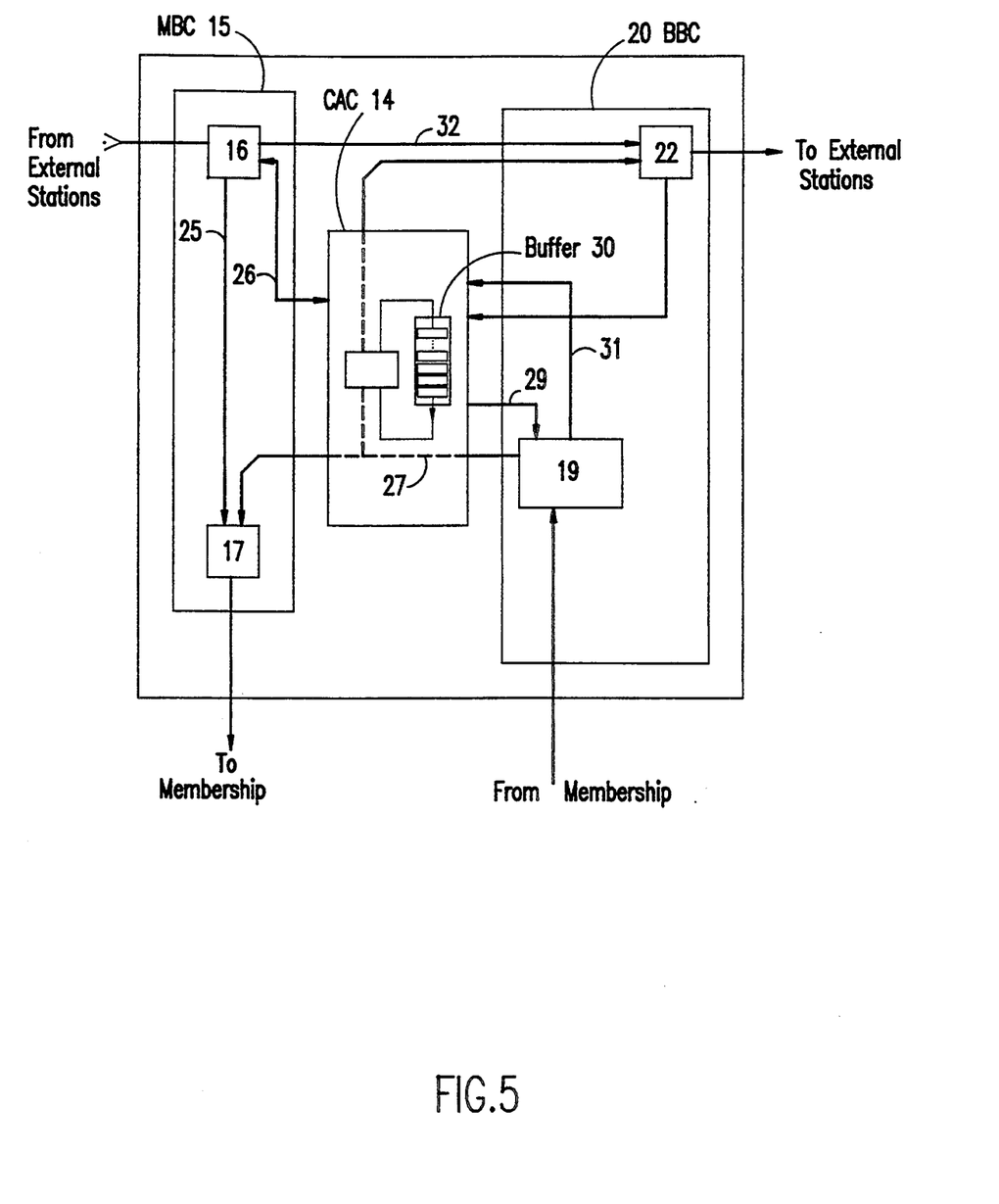
FIG. 5 is a block diagram showing operation of a contention arbitrator and control (CAC) element.

A fourth component of this invention is the Contention Arbitrator and Control (CAC) 14 shown in FIGS. 2 and 5. The CAC 14 arbitrates the flow of frames between the MBC 15 and the BBC 20. Flow contention occurs when the transmissions existing on separate ring paths from two sources are attempting to transmit to be simultaneously forwarded to, and transmitted upon, a common ring path. This can occur at the inputs to both the MBC 15 and the BBC 20. CAC 14 operation is such as that it gives highest priority to continued delay-free performance of the ring to the External Stations 1 when either the SKIPPING or HOPPING functions is instituted. Alternatively, it may give priority of passage to source-to-destination transmissions over destination-to-source returns. This is particularly a consideration since contention normally occurs only between frames from an inter-group transmission on the way to its destination station and frames that are returning to their originating station for acknowledgement.

In the preferred embodiment shown in FIG. 5, the CAC 14 gives priority to frames from the External Stations 1 in the following way. In one case of contention—in the absence of the CAC 14—the MBC 15 would receive frames at terminal 17 for forwarding to its Membership 8 simultaneously from both the External Stations 1 via line 25 and from the BBC 20 via line 27. It is obvious that the MBC 15 can not service both of these requests at the same time. Thus, frames from one of these sources will be forwarded and frames from the other source will be lost. The CAC 14 resolves this path contention by monitoring the BUSY_FLAG1 signal from the MBC 15 via line 26. The MBC 15 activates its BUSY_FLAG 1 on line 26 whenever it has frames for forwarding to its Membership 8. When the CAC 14 detects an active BUSY_FLAG on line 26 from the MBC 15, it buffers the frames received via line 27 from the BBC 20 in Buffer 30, so as to delay their transmittal to the MBC 15 until the BUSY_FLAG1 signal on line 26 is deactivated. The Buffer 30 memory is large enough to satisfy the temporary storage needs of the frames from the BBC 20 that are encountered under normal operating conditions. If the buffer 30 should overflow during a burst of activity, the CAC issues a buffer RECEIVE_OVERFLOW_FLAG via line 29 to the BBC 20. For the duration that the BBC 20 receives the RECEIVE_OVERFLOW_FLAG via line 29 it routes all its frames via line 31 to the External Stations 1, temporarily overriding the "rights controlled" bypass function. When the RECEIVE_OVERFLOW_FLAG on line 29 is deactivated the BBC 20 resumes performance of its normal "rights control" and bypass function. In the event that the MBC 15 is busy processing a frame from Membership 8 via line 27 when a priority main ring frame arrives at the MBC 15, the MBC 15 will divert the frame to buffer 30 via line 26. While the buffer 30 is being filled from line 26, the CAC 14 looks for the end of the frame being sent to terminal 17 via line 27 and shunts any further frames to the External Stations 1 via line 31 by issuing a RECEIVE_OVERFLOW_FLAG, temporarily overriding both the external bypass function of BBC 20 and the buffering function of the CAC 14 regarding frames received by the BBC 20 from Membership 8.

Contention can also occur at the BBC 20 when—in the absence of the CAC 14—the BBC 20 would receive frames at terminal 22 for forwarding to the External Stations 1 simultaneously from both its Membership 8 via line 31 and from the MBC 15 via line 32. It is obvious that the BBC 20 cannot service both of these requests at the same time. Thus, frames from one of these source will be forwarded and frames from the other source will be lost. The CAC 14 resolves this path contention by monitoring the BUSY_FLAG2 signal from the MBC 15 via line 26. The MBC 15 activates its BUSY_FLAG2 on line 26 whenever it has frames for forwarding to the External Stations 1. When the CAC 14 detects an active BUSY_FLAG2 signal on line 26 from the MBC 15, it buffers the frames received via line 31 front the BBC 20 in Buffer 30, so as to delay their transmittal to the External Stations 1 until the BUSY_FLAG2 on line 26 is deactivated. The buffer 30 releases these frames back to the BBC 20 for transmittal to the External Stations 1 only after it detects the deactivation of the BUSY_FLAG2 signal on line 26. The Buffer 30 memory is large enough to satisfy the temporary storage needs of the frames from the BBC 20 that are encountered under normal conditions. If the Buffer 30 should overflow during a burst of activity the CAC issues a buffer TRANSMIT_OVERFLOW_FLAG signal via line 26 to the MBC 15. For the duration that the MBC 15 receives the TRANSMIT_OVERFLOW_FLAG signal on line 26 the MBC 15 routes all its frames via line 25 to the Membership 8, temporarily overriding the "rights controlled" bypass function. When the TRANSMIT_OVERFLOW_FLAG on line 26 is deactivated the MBC 15 resumes performance of its normal "rights control" and bypass function.

Multiple Rights Controlling Concentrators

Figure 6:
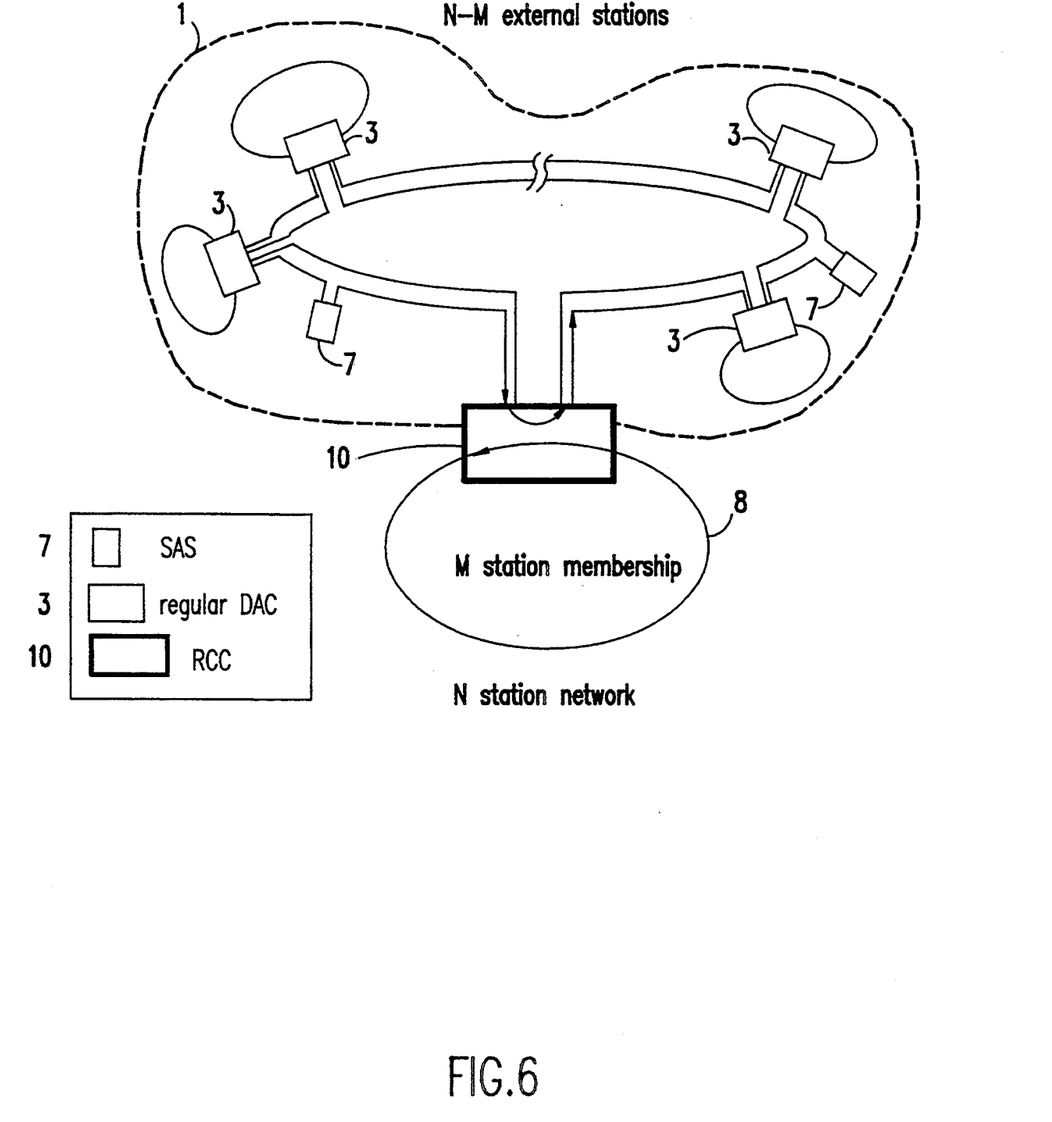
FIG. 6 is a diagram showing a network of N stations with a single RCC and membership size M.
Figure 7:
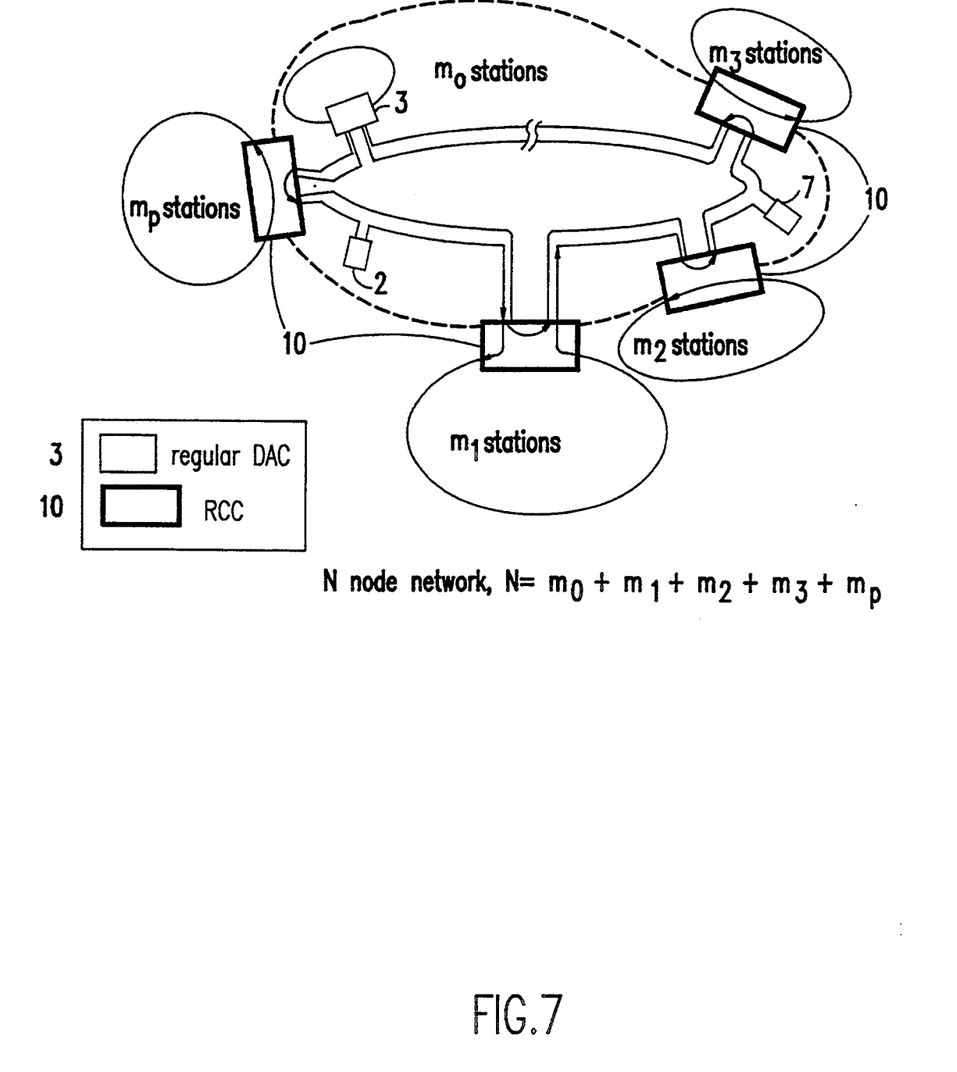
FIG. 7 is a diagram showing a network of N stations with a multiplicity of RCCs.

A network with a single RCC 10 is shown in FIG. 6. A typical configuration may use many RCCs 10 as shown in FIG. 7. Actually, all concentrators within a network could be RCCs so as to maximize the achieved performance advantages described herein. The RCC 10 can be configured in either a singly attached or a dually attached manner. Thus, it can be used instead of either a SAC 6 or a DAC 3. The novelties of this invention do not relate specifically to the manner of attachment.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. In a local area network conforming to a ring-of-trees topology and a token-based protocol governing communication, said ring-of-trees topology having a plurality of tree nodes, each tree node comprising:

a front end and a back end, said front end having an 'A' port for input and a 'B' port for output, said back end having a plurality of 'M' ports for attachment of standard and non-standard network elements supporting said token-based protocol governing communication;

a plurality of network elements, each 'M' port being itself connected to a network element, said 'M' ports within each tree node being serially connected so that all network elements in said network are serially connected to form a topological ring;

said token-based protocol governing communication between network elements through packets transmitted around said ring; and a rights controlling concentrator within said tree node to provide minimum path routing of packets, said rights controlling concentrator including means for separating "rights of receiving" from "rights of transmitting" of network elements connected to said 'M' ports and controlling these rights independently, said means being in conformance with said token-based protocol governing communication, wherein each said packet traversing said tree node is shunted by said means to bypass said front end, said back end or one or more of said 'M' ports of said back end if none of the network elements avoided by said shunting are supportive of a communication objective of said packet.

2. A local area network conforming to a ring-of-trees topology and a token-based protocol, said topology having a plurality of tree nodes, each said tree node comprising:

a front end and a back end, said front end having an 'A' port for input and a 'B' port for output, said back end having a plurality of 'M' ports for attachment of network elements supporting said token-based protocol governing communication;

a plurality of network elements, each 'M' port being itself connected to a network element, said 'M' ports within each said tree node being serially connected so that all network elements in said network are serially connected to form a topological ring;

said token-based protocol governing communication between said network elements through packets transmitted around said ring; and means within said tree node for separating the "rights of receiving" from the "rights of transmitting" and controlling these rights independently, said means being in conformance with said token-based protocol governing communication, wherein each said packet traversing said tree node is shunted to bypass said front end, said back end or one or more of said 'M' ports of said back end if none of the network elements avoided by said shunting are supportive of a communication objective of said packet, wherein said means further comprises means for separating said packets into data packets and token packets for transmission on the network;

a backbone bypass controller (BBC) for shunting packets from said back end so as to bypass said front end;

a membership bypass controller (MBC) for shunting packets from said front end so as to bypass said back end;

an M-port bypass circuit (MPBC) at each of said 'M' ports which, under control by said MBC, causes a packet to bypass said network elements attached to a corresponding 'M' port; and a contention arbitrator and control (CAC) element for resolving conflicts between packets, simultaneously routed to said BBC or said MBC, and avoiding loss of packets.

3. A method of providing minimum path routing of packets on a token ring network of trees, said network having a plurality of trees and standard and non-standard stations supporting a token-based protocol governing communication with each of a number of stations being connected to said token ring network of trees through one of said trees, said method comprising:

separating packets into data packets and token packets for transmission on the network;

affording rights of transmitting to said stations;

routing said token packets through each station of said network that is afforded rights of transmitting;

giving receiving rights to a tree of said network;

routing said data packets through all stations of a tree of said network only if said tree is given receiving rights for said data packet by nature of its being addressed to one of said all stations of said tree; and controlling separately the rights of transmitting and rights of receiving of the stations of said tree via hopping.

4. A method of providing minimum path routing of packets on a token ring network of trees, said network having a plurality of trees and stations supporting a token-based protocol governing communication with each of a number of said stations being connected to said network through one of said trees, said method comprising the steps of:

separating said packets into data packets and token packets for transmission on the network;

affording stations of said network rights of transmitting;

routing said token packets through each station of said network that is afforded rights of transmitting;

giving a tree of said network receiving rights, receiving rights for a tree otherwise being withheld;

routing said data packets through all stations of a tree of said network only if said tree is given receiving rights for said data packet by nature of its being addressed to one of said all stations of said tree;

routing a data packet to bypass all stations of said tree, when receiving rights are withheld, if said data packet is addressed to any of said all stations of said tree;

controlling separately the rights of transmitting and rights of receiving of the stations of said tree via skipping and hopping of packets; and arbitrating contention between packets on said ring according to a priority scheme, said priority scheme providing delay-free performance of the token ring network when skipping and hopping said packets.

* * * * *